United States Patent
Phang et al.

(10) Patent No.: US 9,044,679 B2
(45) Date of Patent: Jun. 2, 2015

(54) WIRELESS COMMUNICATION SYSTEM FOR PORTABLE GAMING DEVICE

(71) Applicants: Ingrid J. Phang, Coral Springs, FL (US); Christopher W. Phang, Coral Springs, FL (US)

(72) Inventors: Ingrid J. Phang, Coral Springs, FL (US); Christopher W. Phang, Coral Springs, FL (US)

(73) Assignee: CANE WIRELESS INC., Coral Springs, FL (US)

( * ) Notice: Subject to any disclaimer, the term of this patent is extended or adjusted under 35 U.S.C. 154(b) by 140 days.

(21) Appl. No.: 13/790,730

(22) Filed: Mar. 8, 2013

(65) Prior Publication Data
US 2014/0073433 A1 Mar. 13, 2014

Related U.S. Application Data

(60) Provisional application No. 61/699,811, filed on Sep. 11, 2012.

(51) Int. Cl.
| | |
|---|---|
| *H04B 1/38* | (2006.01) |
| *H04M 1/00* | (2006.01) |
| *A63F 13/30* | (2014.01) |
| *A63F 13/98* | (2014.01) |
| *A63F 13/90* | (2014.01) |

(52) U.S. Cl.
CPC ............ *A63F 13/12* (2013.01); *A63F 13/02* (2013.01); *A63F 13/08* (2013.01); *A63F 2300/1031* (2013.01); *A63F 2300/1043* (2013.01); *A63F 2300/1081* (2013.01)

(58) Field of Classification Search
USPC ............... 455/553.1, 556.1, 566, 573, 575.1, 455/575.8, 90.3
See application file for complete search history.

(56) References Cited

U.S. PATENT DOCUMENTS

| | | | | |
|---|---|---|---|---|
| 6,922,473 | B2 * | 7/2005 | Turnbull | 381/74 |
| 7,107,017 | B2 * | 9/2006 | Koskelainen et al. | 455/90.2 |
| 7,502,625 | B2 * | 3/2009 | Beamish et al. | 455/553.1 |
| 7,593,744 | B2 * | 9/2009 | Majahan | 455/519 |
| 7,729,684 | B1 * | 6/2010 | Straub | 455/404.2 |
| 8,469,817 | B2 | 6/2013 | Eck et al. | |
| 8,718,728 | B2 * | 5/2014 | Katis et al. | 455/575.8 |
| 2013/0017788 | A1 * | 1/2013 | Norair et al. | 455/41.2 |

* cited by examiner

*Primary Examiner* — Blane J Jackson
(74) *Attorney, Agent, or Firm* — The Concept Law Group, P.A.; Scott D. Smiley; Yongae Jun

(57) ABSTRACT

A portable wireless communication device configured for attachment to a portable electronic video game device, facilitating voice or data communication, or both, between one or many users. The invention includes a two-way radio transceiver that is preferably powered by alkaline or rechargeable type batteries.

18 Claims, 12 Drawing Sheets

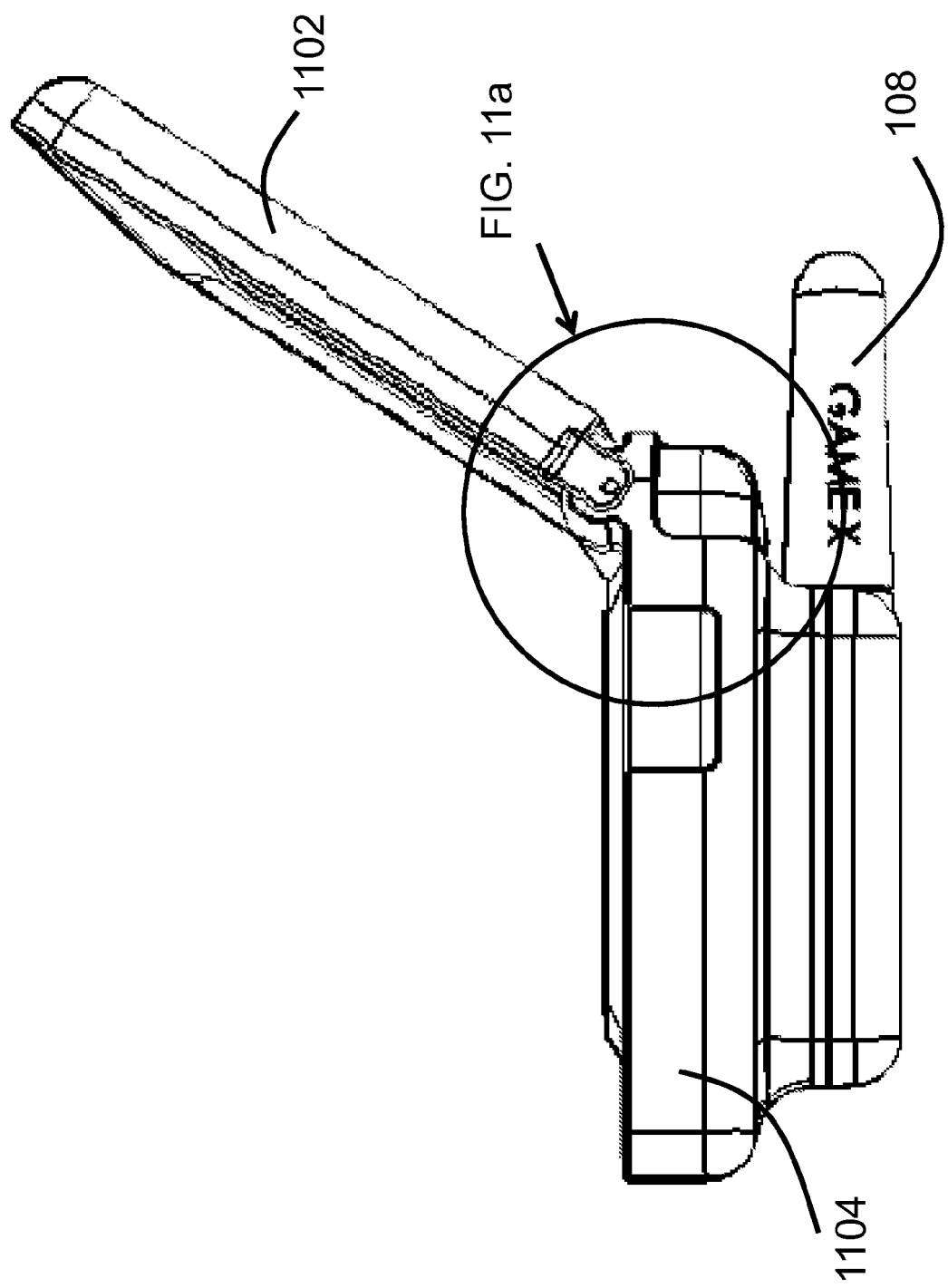

WIRELESS COMMUNICATION SYSTEM FOR PORTABLE GAMING DEVICE

CROSS-REFERENCE TO RELATED APPLICATION

This application claims priority to U.S. Provisional Patent Application No. 61/699,811 filed Sep. 11, 2012, the entirety of which is incorporated by reference.

FIELD OF THE INVENTION

The invention relates to the field of portable electronic video gaming and two-way radio communication, and more particularly, the invention comprises a two-way radio device that is configured to attach to a portable (hand held) electronic video game device, facilitating voice or data communications, or both, when used with similar devices and also serves as a protective case for the portable video game device.

BACKGROUND OF THE INVENTION

There are many known devices for communicating wirelessly between two or more users. Most of these devices used recreationally are portable handheld two-way radio devices that operate in the license free Family Radio Service (FRS) and licensed General Mobile Radio Service (GMRS) band. These devices are primarily used for communicating outdoors during camping, caravanning, hiking, or other family outings to keep in touch with family members and or friends. Consumer two-way radios operating on the FRS and/or GMRS band operate at Ultra High Frequencies (UHF) with transmit output power ranging from 0.5 W to 2 W. These devices have a typical talk range of two miles and can communicate up to line of sight (no obstruction between transmitting and receiving device) of more than 20 miles.

Portable electronic video game devices offer video gaming on the go. Some of these devices also offer basic short range wireless communication capability via digital data (no voice) operating in the license free 2.4 GHz Industrial Medical and Scientific (ISM) frequency band. The communication range of these devices are very limited as they have a transmit output power of 10 mW to 100 mW providing a typical communication range of less than 100 ft.

In recent years, fixed and portable video gaming devices allow for connectivity via the internet, allowing users to communicate when gaming with other players. This enhances the gaming experience as users can immediately comment, share their adventures, coordinate efforts, and speak with each other from distant locations when connected to the internet. However, connection to the internet is most suited for fixed gaming devices, as they require access to a Local Area Network (LAN), which requires infrastructure and does not allow for portability beyond the limited range of the wireless access point.

Standard consumer two-way radio devices, although portable and able to be used independently to facilitate voice communication while using a portable video game device, is cumbersome and would require the user to pause during gaming activity to use the radio device. It would also require the user to carry two devices when on the go, which may be inconvenient and result in the user not carrying the radio at all. Therefore, a need exists to overcome the problems with the prior art as discussed above.

SUMMARY OF THE INVENTION

The invention provides a Wireless Communication System for Portable Gaming Device that overcomes the hereinafore-mentioned disadvantages of the heretofore-known devices and methods of this general type and that includes a two-way communication device that is configured to attach to a portable (hand held) electronic video game device, facilitating voice or data communications, or both, when used with similar devices. The invention also advantageously serves as a protective case for the portable video game device.

The present invention integrates both aspects of the portable video gaming and wireless communication devices into one, allowing for mid- to long-range voice communication on the go that takes the portable video gaming experience to the next level. In a particular embodiment, by attaching the wireless communication device to the portable video game device, the wireless communication device operates to provide seamless wireless communication to the user, via a communication function, controlled with a Push-to-Talk (PTT) button located for ease of access while holding and operating the gaming device, allowing the user to communicate without having to pause their activity. The communication function may be facilitated via a two-way radio, Wi-Fi, Bluetooth and other various embodiments discussed herein.

The inventive wireless communication device is preferably attached to the bottom of the portable video game device, preferably by the use of mechanical features similar to those used in a typical protective hard-case designed for such devices. The two-way radio device is preferably powered by standard alkaline and/or rechargeable type batteries and may contain a method of charging the rechargeable batteries. The invention preferably includes a liquid crystal display (LCD) for ease of programming radio settings and to view radio status. The device would preferably include standard two-way radio features such as, but not limited to, frequency scan and voice-operated transmit (VOX) that allows the user to communicate hands free without having to press the PTT button while playing a game.

The wireless communication device may also provide auxiliary power to the portable video game device, functioning as a battery life extender or charger for the portable video game device. This is preferably implemented with a DC-to-DC voltage converter that provides a fixed voltage to the portable video game device preferably by conductive mechanical contacts interfacing with the charging contacts or jack on the portable video gaming device.

Although the use of a two-way radio operating on the license-free FRS band or the licensed GMRS band utilizing analog voice communication is proposed in this invention, it should not be limited as such. Other operating bands or methods such as the license-free 900 MHz ISM band or digital modulation types such as frequency-shift keying (FSK), frequency-hopping spread spectrum (FHSS), etc., may be used for voice and/or data transmission.

With the foregoing and other objects in view, there is provided, in accordance with the invention, a portable wireless communication device configured for attachment to a portable electronic video game device that includes a housing configured to be attached to said portable electronic video game device, a transceiver coupled with said housing, and at least one antenna.

In accordance with a further feature of the present invention, the transceiver is a two-way radio transceiver. The communication device may include a Push-to-talk (PTT) button to initiate transmission. Yet further, the communication device is able to detect voice and transmit automatically using VOX.

In accordance with yet another feature of the present invention, the transceiver uses analog coded squelch (CTCSS) to establish a call. In accordance with yet still another feature, the transceiver uses digital coded squelch (DCS) to establish a call. The transceiver may use frequency hopping channels to establish a call.

In accordance with a further feature of the present invention, the communication device may further include a means to provide auxiliary power to the portable video gaming device.

In accordance with a feature of the present invention, the communication device may include at least one display. The communication device may provide caller ID when a call is received.

In accordance with yet another feature of the present invention, the detector is a microphone. The communication device of claim 1, wherein said means of attachment is with tabs optimally placed in the communication device housing to secure to the portable video game device.

In accordance with yet still another feature of the present invention, the transceiver is a two-way radio operating on the license free Family Radio Service (FRS) frequencies. Alternatively, the transceiver is a digital two-way radio operating on the license free Industrial Scientific and Medical (ISM) band.

In accordance with an embodiment, the portable wireless communication device includes a game cartridge interface configured to mate with a game cartridge slot of the portable electronic video game device. The housing is a protective housing configured to protect the portable electronic video game device. The transceiver is configured to facilitate digital messages between at least two portable electronic video game devices. The portable wireless communication device includes a game cartridge slot configured to mate with a video game cartridge. The portable wireless communication device is further configured to facilitate delivery of text messages to a display of the electronic video game device.

Although the invention is illustrated and described herein as embodied in a wireless communication system for portable gaming device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 11 is a side perspective view of the wireless communication device configured having a hinge for permitting rotation in relation to a screen of the portable video game device.

DETAILED DESCRIPTION

Figure 1:
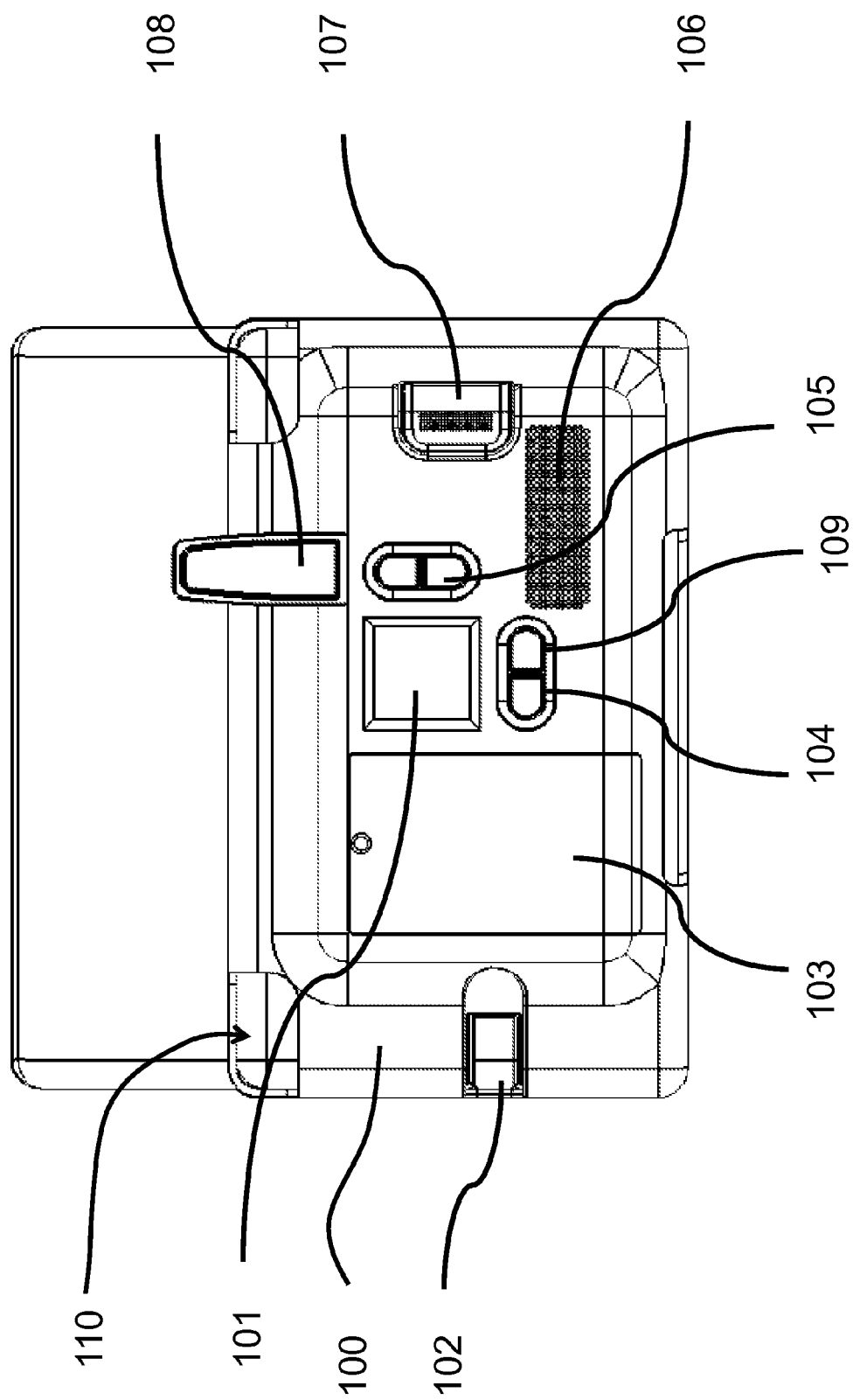
FIG. 1 is a bottom view of the invention, when attached to the portable video game device, showing the preferred layout of the buttons in accordance with the principles of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient wireless communication device that couples to a portable electronic video game device.

Referring now to FIG. 1, one embodiment of the present invention is shown in a perspective view of the bottom of the present invention in an assembled state. The term "assembled state," indicates that the wireless communication device 100 is coupled to a portable electronic gaming device 110. The wireless communication device 100 specially shaped to attach to a portable electronic video game device 110, preferably to the bottom of the device. The term "shaped," as used herein, indicates a mechanical structure that is sized and dimensioned to receive and adhere to the second object, in this case the portable electronic gaming device 110. In a preferred embodiment, the wireless communication device 100 is designed to match and mate with the outside cover of a portable electronic gaming device 110. In one example, a plurality of shapes of the wireless communication device 100 are available and a user would select one of the plurality of shapes that is specifically dimensioned to mate with the electronic gaming device 110 owned or used by that user. The mating can be facilitated by tabs 1002, 1004 (shown in FIG. 10) that meet with recesses, snap fit relationships between the components, and others. Of course, the invention includes features that would allow it to readily and securely attach as shown, though the user should bear in mind that many other possibilities to securely attach the wireless communication device 100 to the portable video game device 110 exist. Such methods include adhesives, form fitted rubber over molds, screws, and many others.

The present invention includes a push-to-talk (PTT) button 107 that is positioned in the housing of the wireless communication device 100. The PTT button 107 allows the user to quickly and conveniently switch between listening and transmit modes of the wireless communication device 100 while holding and playing the portable videogame device 110. More specifically, and with reference to FIG. 3, a user can hold the wireless communication device 100 so that the portable video game's display screen 205 faces and is visible to the user while his or her hands are holding the lower portion of the wireless communication device 100. In this position, the PTT button 107 is easily reached and activated by the user's fingers. For example, if the user of the portable videogame device is playing against a friend down the street and would like to verbally communicate with that friend, the user would simply need to push the PTT button 107, convey his message verbally, let go of the PTT button 107, and wait for his opponent's response. In this example, the wireless communication device works very similar to the well-known WALKIE-TALKIES from years ago. Although the wireless communication device 100 is not limited to standard PTT two-way line-of-sight wireless communication, this particular embodiment provides substantial advantages over the prior art. In particularly, for the first time, users of a portable videogame device not need to rely on infrastructure provided by third-party for communication. For instance, through use of the present invention, multiple players of a videogame living on the same street or even different streets in a neighborhood can all play and actively communicate with each other through the inventive wireless communication device 100. Of course, two-way radios have been known for years, however, because the present invention advantageously mechanically integrates the two-way radio and the portable videogame device 110, users can operate the communication without distracting or requiring them to divert their fingers from the videogame operation.

The term "portable video gaming device," as used herein, is intended to refer to a device that is powered entirely by batteries. In other words, portable video gaming devices are distinguished from console gaming devices that require or are designed to be powered by a full-time connection to AC voltage through a plug. Although console gaming devices, can be powered by batteries, they are not intended to be operated solely by battery power. In contrast, portable video gaming devices are intended to be used and powered by batteries for extended periods of time. Referring back to FIG. 1, a battery door 103 attaches to the housing of the wireless communication device 100 and is secured preferably by a screw, or other mechanical measures, to prevent unintended removal of the door 103 by small children. The battery compartment is preferably designed to accommodate the use of either individual alkaline or rechargeable type cells, individual or packaged.

Slots 102 in the housing allow access to a gaming stylus that is designed to fit into the housing of the electronic portable video game device 110. Alternately, the stylus could be designed to fit into the housing of the wireless communication device 100. A speaker 106 provides audio for received voice transmissions and alert tones. Power button 104 manually powers the wireless communication device 100 on or off as desired. Menu button 109 is used to access the radio features, and volume/scroll buttons 105 allow scrolling function when accessing features in the menu and to change channels or to adjust volume settings of the radio. All buttons are preferably recessed in the housing of the wireless communication device 100 to prevent inadvertent activation when placed on a flat surface or during operation of the portable video game device 110. A display 101 provides viewing of the radio status such as current channel and battery level when operational. An antenna 108 is attached to the housing of the wireless communication device 100 and is used to radiate or receive radio frequency (RF) transmissions for wireless communication. Although shown as an external attachment to the device, it should be noted that the antenna could be encased inside the housing of the wireless communication device 100. Electrical elements (not shown) embedded in the housing of the wireless communication device 100 allow operation of the two-way radio transceiver.

Figure 2:
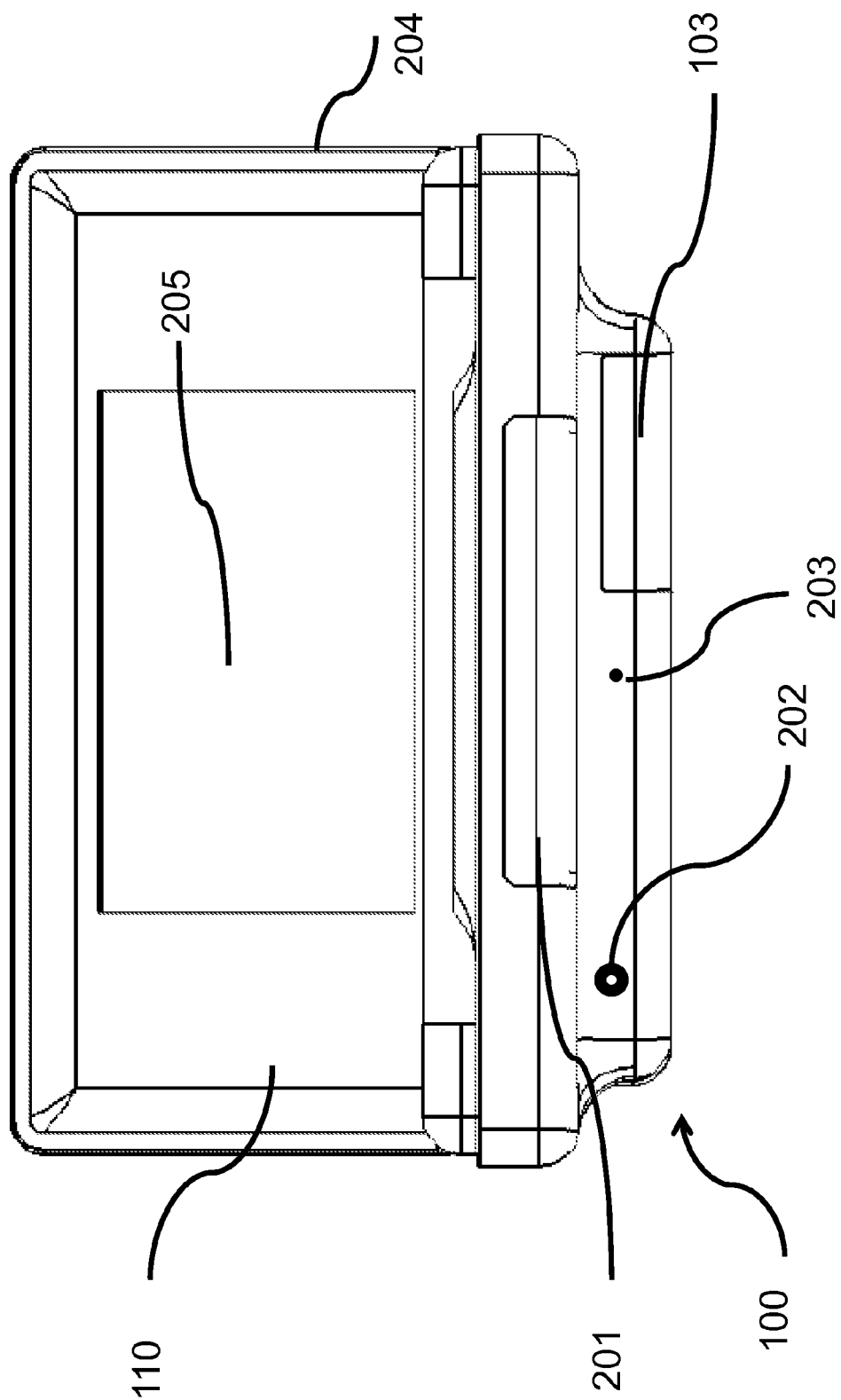
FIG. 2 is a front elevational view of the invention, when attached to the portable video game device in accordance with the principles of the present invention.

FIG. 2 shows an elevational view of the front of the present invention in an assembled state. A slot 201 in the housing allows access to insert a game cartridge (not shown) into the portable video game device 110. The accessory jack 202 facilitates use of wired audio accessories to privately monitor conversation and to operate hands-free using VOX feature. A microphone 203 allows for voice input and is located such that it can optimally receive audio waves without obstruction during use. Although not shown in the present embodiment, LED indicator(s) to show power or operating status can also be provided.

Figure 3:
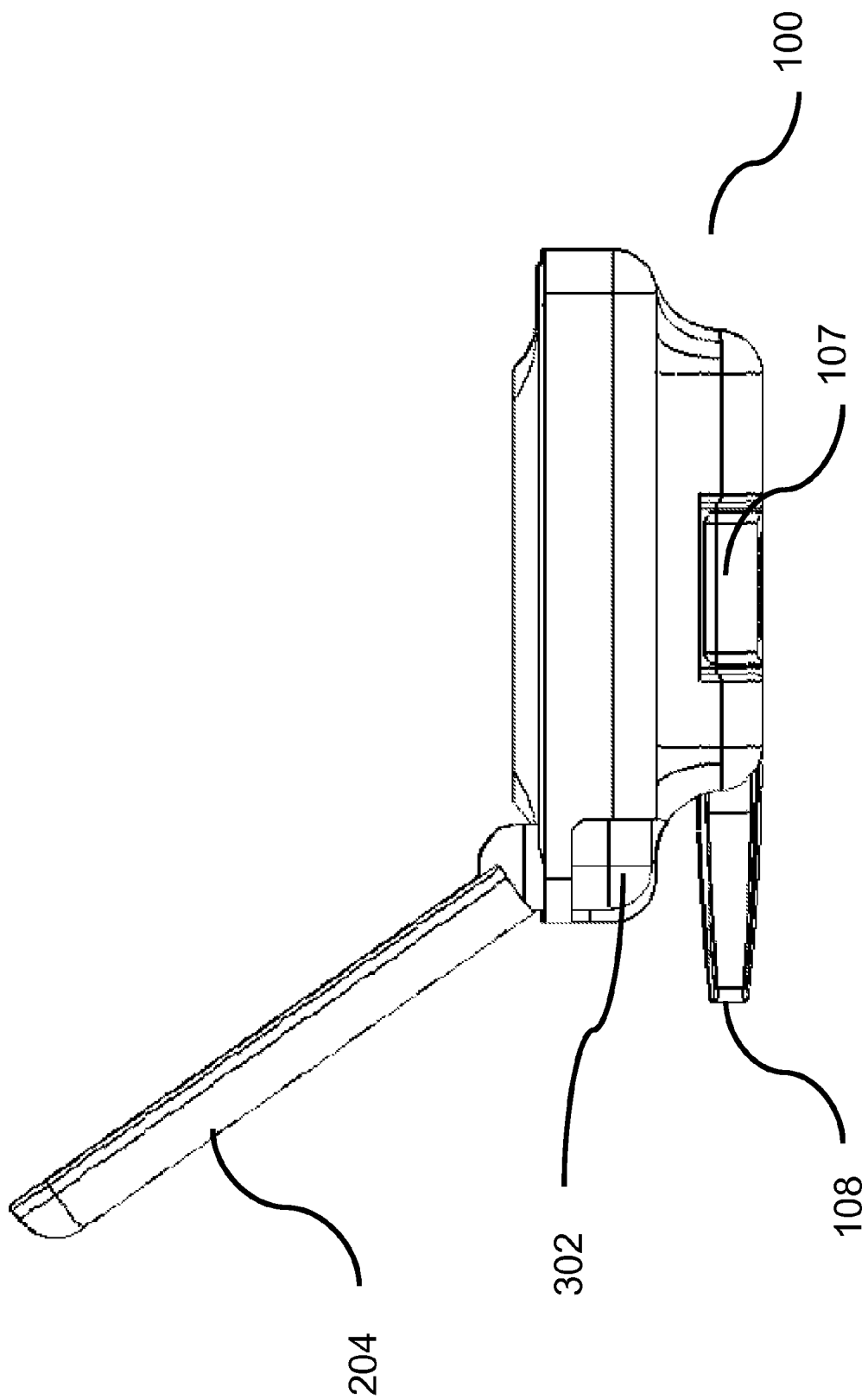
FIG. 3 is a left side elevational view of the invention, when attached to the portable video game device, showing the location of the PTT button in accordance with the principles of the present invention.

FIG. 3 shows an elevational view of the left side of an embodiment of the present invention. A protective cover 204 for the top lid of the portable video game device 110 is shown in this view. The protective cover 204, however, is not necessary.

Figure 4:
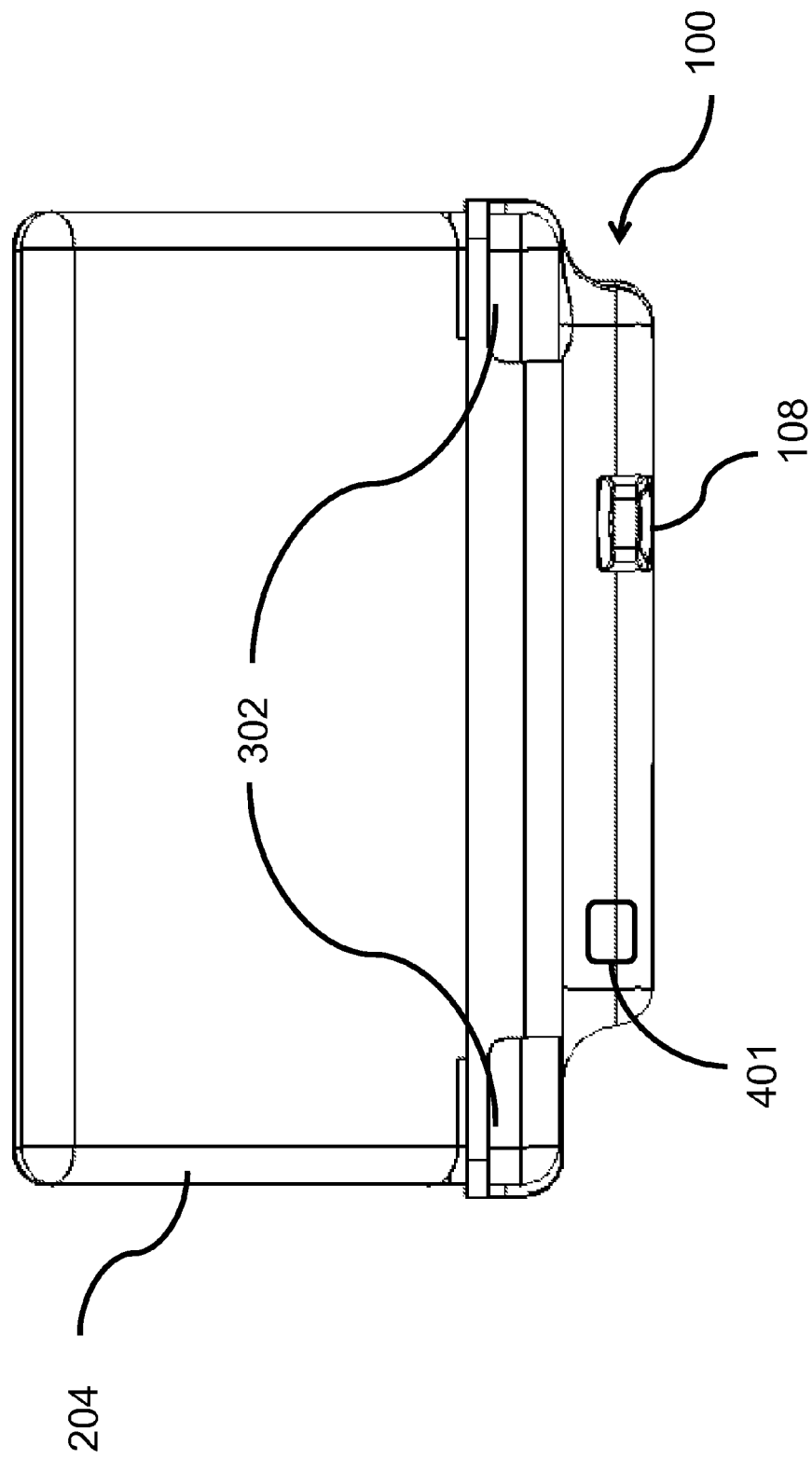
FIG. 4 is a rear elevational view of the invention when attached to the portable gaming device in accordance with the principles of the present invention.

FIG. 4 shows an elevational rear view of the present invention. Slots in the housing to allow access to the portable video game device 110 control buttons 302, if available, and a charging port 401 of the portable video game device 110. The wireless communication device 100 charging port 401 shown in the current embodiment is used to connect a power supply (not shown) to charge rechargeable type batteries if inserted in the battery compartment 103. Alternately, although not shown, the present invention would preferably allow the capability to provide power to the portable video gaming device 110 allowing both devices to be charged together or independently by the same power supply source plugged into the charging port 401. It would also allow the wireless communication device 100 to share battery power to the portable video game device to extend operation if needed. Alternately, the present invention would preferably allow the capability to be inserted into a charging dock that would facilitate the charging of the rechargeable batteries in the wireless communication device or the portable video game device or both (not shown).

Figure 5:
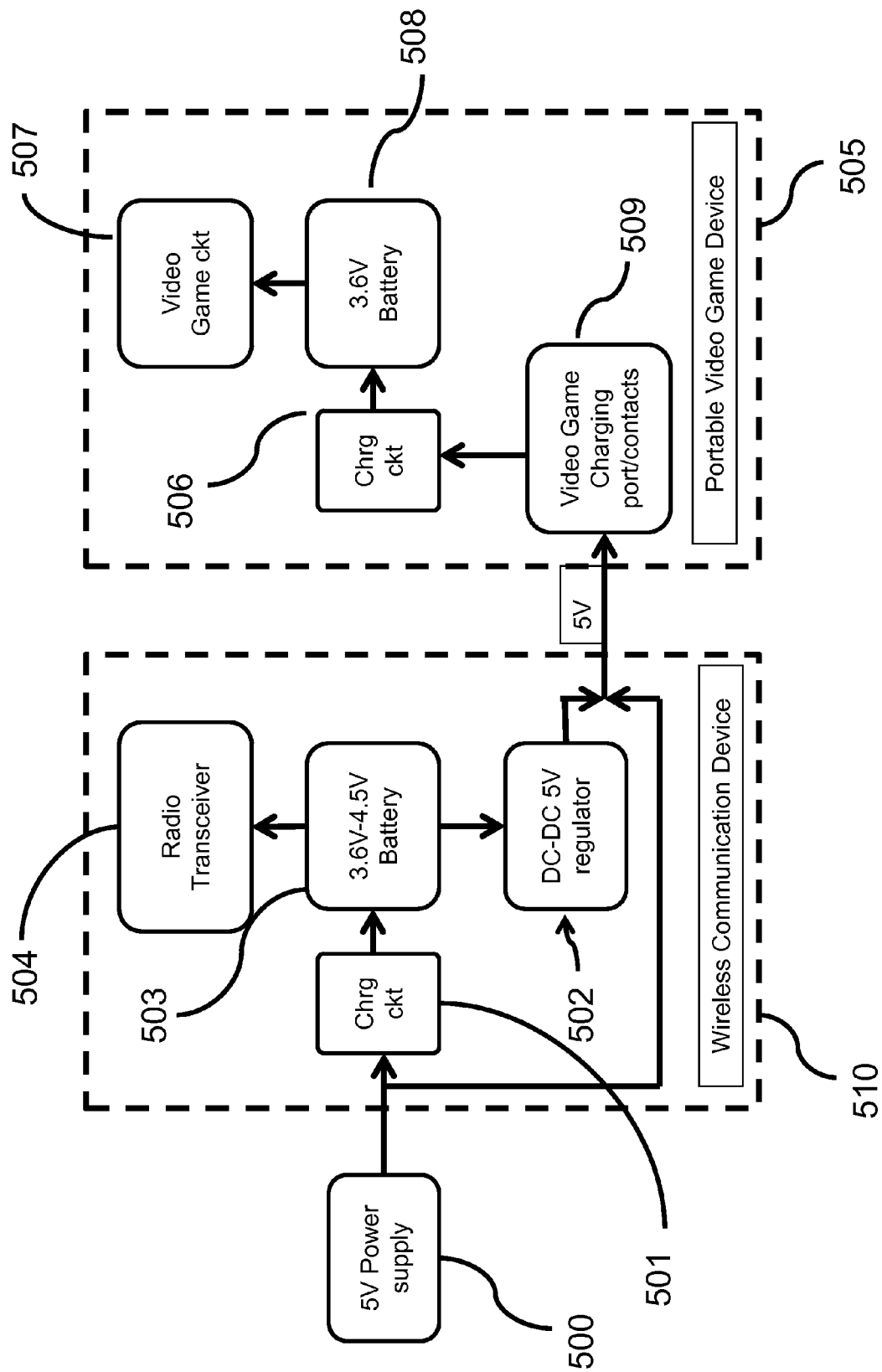
FIG. 5 is a block diagram of the power distribution showing the transfer of power from the wireless communication device to the Portable video game device in accordance with the principles of the present invention.

FIG. 5 is a block diagram of the preferred power distribution showing the transfer of power from the wireless communication device to the portable video game device. The power supply 500 plugs into a standard AC wall outlet (not shown) and provides the required charge output voltage (typically 5V) required to charge the wireless communication device battery 503 and the portable video gaming device battery 508. The voltage is then distributed to the wireless communication device charging circuit 501 and the portable video game device charging circuit 506 (via the video game device charging contacts/port 509) so both devices can be charged simultaneously. Backfeed protection (not shown) is provided to prevent current flow from the DC-to-DC switching regulator 502 back into the wireless communication device charging circuit 501 and vice-versa. When the power supply 500 is removed, the portable video game device can be charged from the wireless communication device battery 503 via the DC-to-DC switching regulator 502 used to provide a constant voltage to the portable video game device charging circuit 506.

Figure 6:
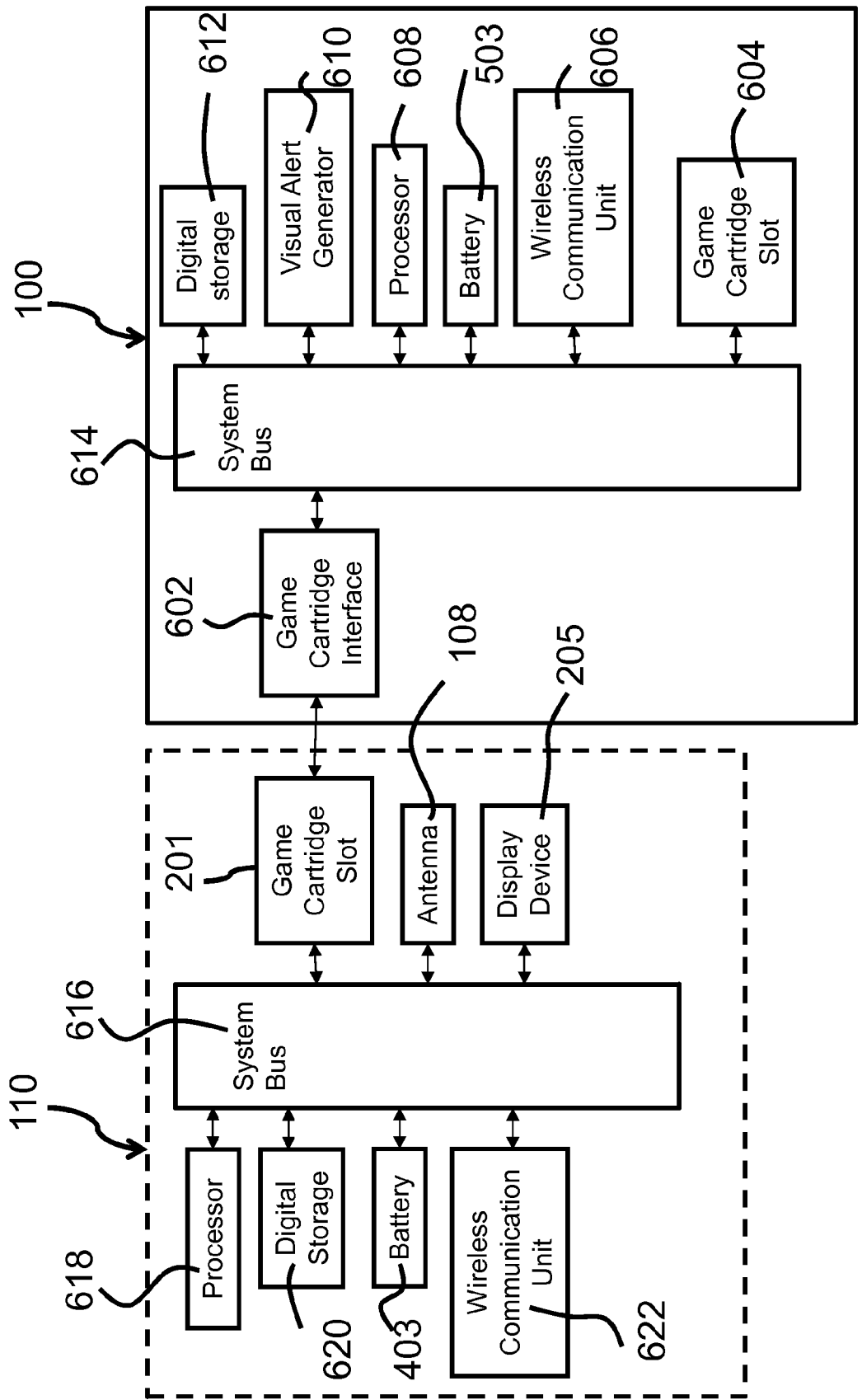
FIG. 6 is a block diagram of the game cartridge interface between the wireless communication device and the portable video game device in accordance with the principles of the present invention.

FIG. 6 is a block diagram of the game cartridge interface between the wireless communication device 100 and the portable video game device 110. The wireless communication device 100 includes a processor 608 for processing digital data. The processor 608 may control data storage in the digital storage 612. A visual alert generator 610 may cause a visual indication to a user of a PTT transmission or other digital messages within the scope of the present invention. The components of the wireless communication device may be interconnected via a system bus 614 or other known methods of interconnecting device components.

Likewise, the video game device 110 includes a variety of components interconnected via a system bus 616 or other known methods of interconnecting device components. The components include a processor configured to process digital data. The processor 618 may receive and transmit digital information from a digital storage 620, wireless communication unit 622, and the game cartridge slot 201, to name a few. The processor 618 may additionally provide, or otherwise cause, data for display on display device 205.

In this embodiment, a game cartridge interface 602 of the wireless communication device 100 removably mates with the game cartridge slot 201 of the video game device 110. In this mating connection, the wireless communication device 100 facilitates video game data communication to the video game device 110. The connection between the game cartridge slot 201 and the game cartridge interface 602 allows the wireless communication device 100 to provide video game data held within a digital storage 612 to the video game device 110. The connection additionally permits the video game device 110 to store digital information within the digital storage 612 of the wireless communication device 100. In one configuration, the digital storage 612 may be configured to maintain the digital data for a plurality of video games to permit cartridge-less video game play on the video game device 110. In one configuration, the wireless communication device 100 includes a game cartridge slot 604 that mates with video game cartridges (not pictured). The video game cartridges that mate with the game cartridge slot 604 may be replaced with other video game cartridges to allow the user to play different games on the video game device 110. In one configuration, the wireless communication unit 606 receives video game data from a cloud or other distant location facilitated via any wireless communication discussed herein or otherwise within the scope of the present invention. In this configuration, the video game data need not be stored locally. Further, the video game data need not be stored in a physical cartridge.

Figure 7:
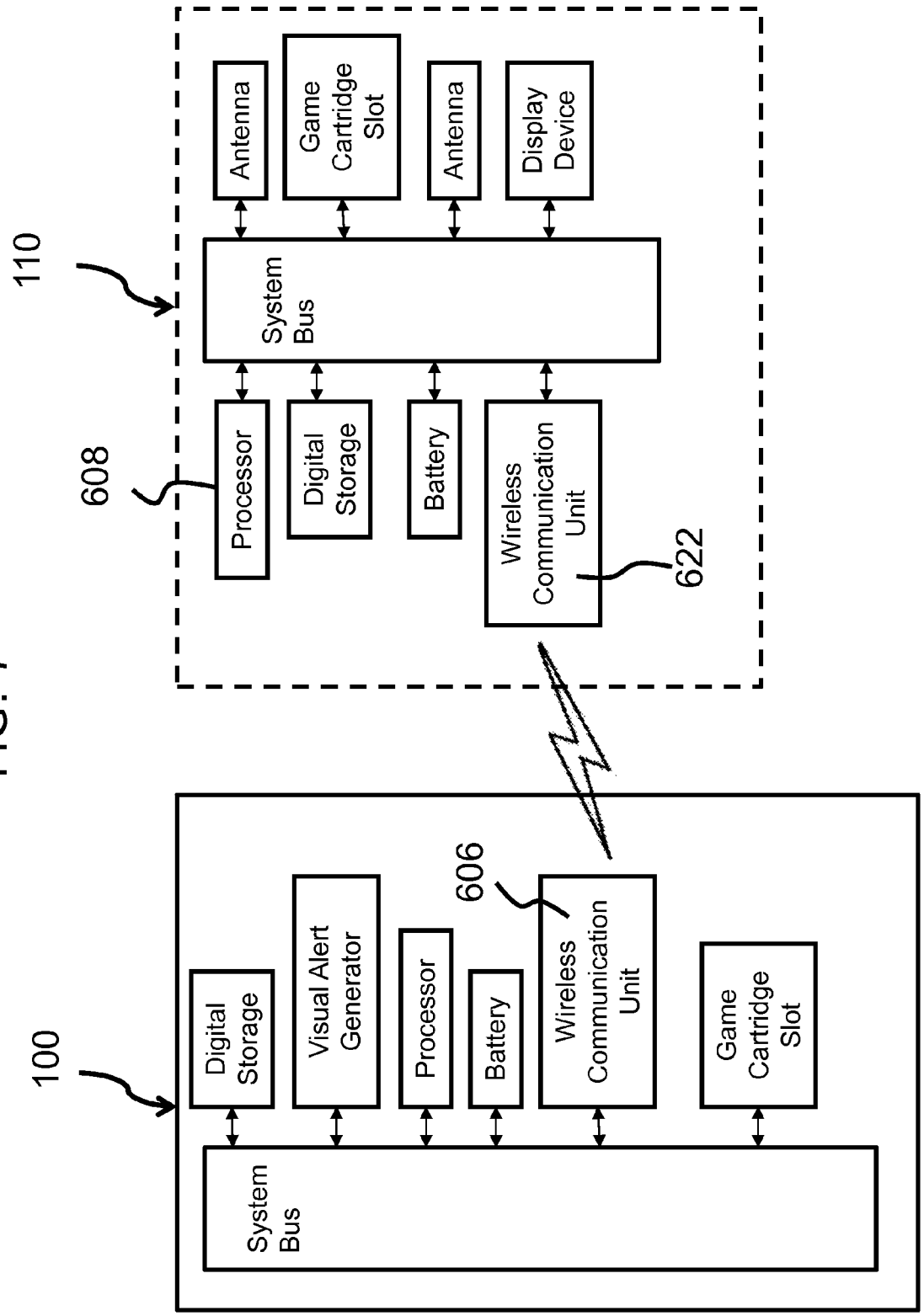
FIG. 7 is a block diagram of the wireless communication between the wireless communication device and the portable video game device in accordance with the principles of the present invention.

FIG. 7 is a block diagram of wireless communication between the wireless communication device 100 and the video game device 110. In this configuration, wireless communication between the wireless communication device 100 and the video game device 110 is facilitated between wireless communication unit 606 of the wireless communication device 100 and a wireless communication unit 622 of the video game device 110. The wireless facilitation of digital information between the wireless communication device 100 and the video game device 110 is implemented via a network for wireless communication, as any type of satellite, Wi-Fi, ZigBee, infrared, Near field communication, Bluetooth, or other communication networks within the scope and spirit of the instant invention. The wireless facilitation of digital information may include video game data held within a digital storage 612—or a distant cloud based storage—to the video game device 110.

Figure 8:
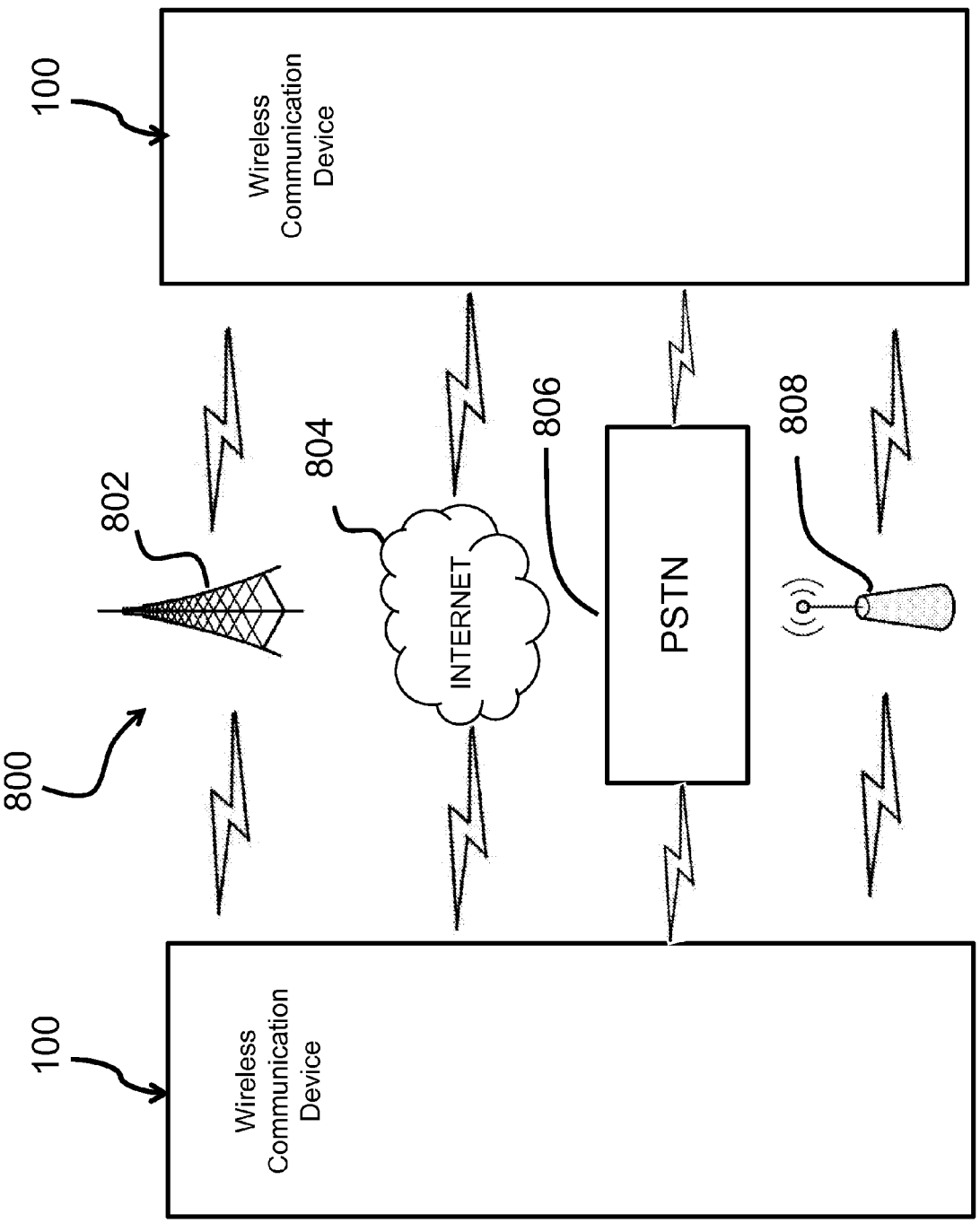
FIG. 8 is a block diagram of the wireless communication between at least two wireless communication devices in accordance with the principles of the present invention.

FIG. 8 is a block diagram of the wireless communication between at least two wireless communication devices 100 in accordance with the principles of the present invention. The at least two wireless communication device 100 may communicate using a PTT RF transmissions for wireless communication. The sound received by any of the wireless communication device 100 may be output from a speaker on either the wireless communication device 100 and/or the portable game device 110. In operation, the wireless transmission unit may transmit or receive across any type of communications network 800. Examples of networks include the World Wide Web and the internet 804, either of which may be facilitated via various embodiments for radio communications such as a cellular communication network 802 and the public switched telephone network (PSTN) 806, or any other wide area network (WAN), as well as local area networks (LANS), such as an Ethernet LAN 808. Yet further, the network 800 may include High Speed Downlink Packet Access (HSDPA) systems, Global System for Mobile Communications (GSM) including General Packet Radio Services (GPRS) systems, Enhanced Data Rates for Global Evolution (EDGE) systems, CDMA/1xRTT systems, Evolution-Data Only or Evolution-Data Optimized (EV-DO), Evolution for Data and Voice (EV-DV) systems, High Speed Uplink Packet Access (HSUPA) systems, and any other like networks. The cellular communication network may include Code Division Multiple. The network 800 may additionally be a wireless network, such as any type of satellite, Wi-Fi, ZigBee, infrared, Near Field Communication, Bluetooth, or other communication networks. The network is not limited to any particular system and method of data communication and may combine any type of system and method for facilitation of data across the network 800.

The wireless communication device 100 is configured to store music and any other digital information. In one embodiment, the portable video game device 110 facilitates digital music storage on the wireless communication device 100 and particularly within any of the storage devices housed in the wireless communication device 100. In particular, the downloaded music may be stored within digital storage 612, an SD card, and/or other removable digital storage located within the wireless communication device 100. Stored or streamed digital music may be output from either the headphone jack 202 and/or the speaker 106. The music to be played may be stored and accessed from digital storage 612. In an embodiment, the music being played is muted when receiving or transmitting PTT communications wherein the music may be configured to resume unmuted play when the PTT communication transmissions end. In another embodiment, the music is paused when receiving or transmitting PTT communications wherein the music may be configured to continue playing when the PTT communication transmissions end. The music may be output from the wireless communication device 100 or may alternatively be output from the portable video game device 110. The user can access music on the wireless communication device 100 via the portable video game device 110. When music is accessed from the wireless communication device, the sound from the video game is muted.

Figure 9:
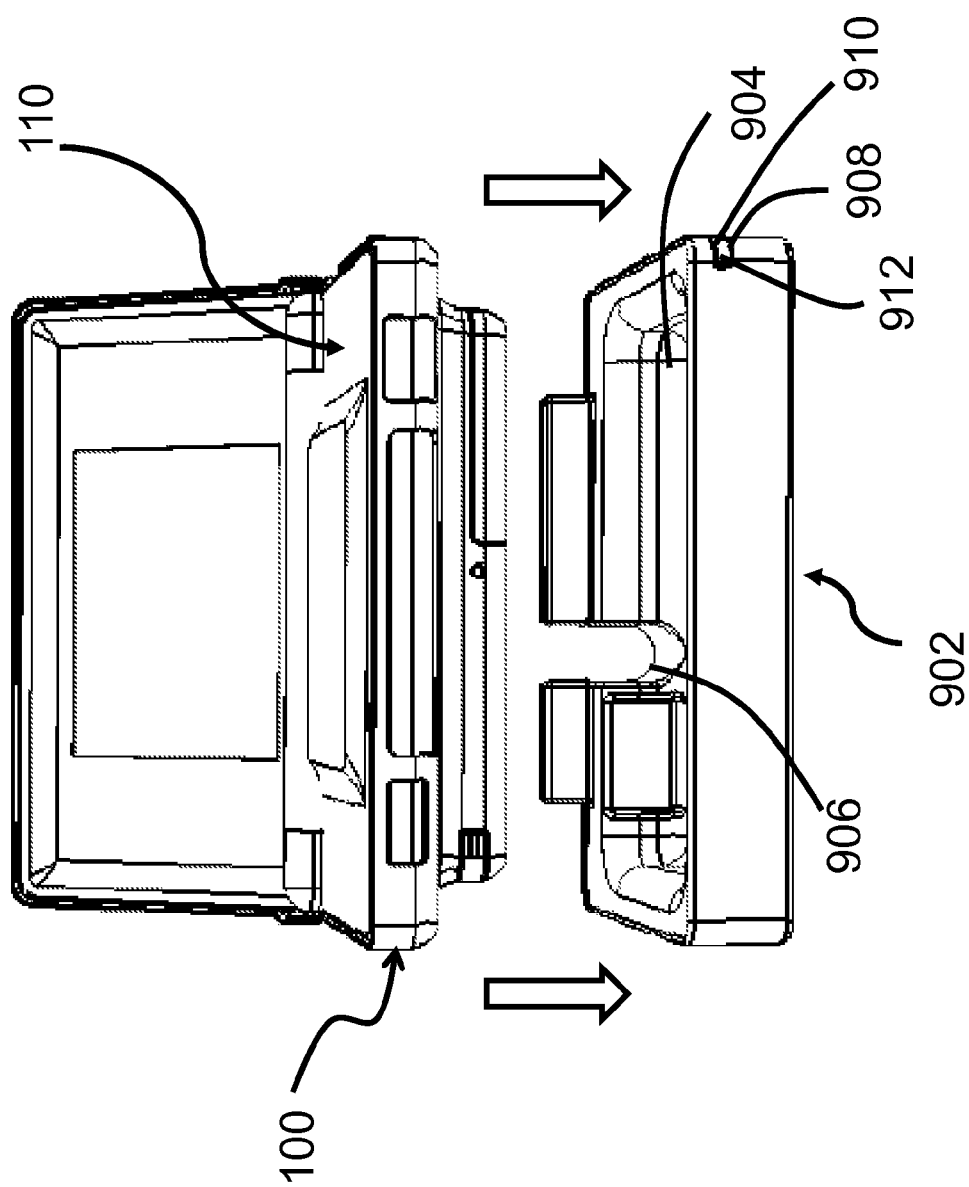
FIG. 9 is a charging base that accepts the attachment of the wireless communication device and the portable video game in accordance with the principles of the present invention.

FIG. 9 is a charging base 902 that accepts the engagement of the wireless communication device 100 and the portable video game device 110. A portion of the base is constructed and arranged to allow the wireless communication device 100 and the portable video game device to sit at least partially within and/or against a form fitted cavity 904 for facilitating charging of the wireless communication device 100 and/or the portable video game device 110. The cavity 904 is form fitted to the shape of the wireless communication device 100 to provide a flush fit between the charging base 902 and the wireless communication device 100. In a configuration, the wireless communication device 100 sits unrestricted within the cavity 904. In another configuration, the wireless communication device 100 sits in a snap fitted connection to the charging base 902. In yet another configuration, the wireless communication device 100 may otherwise removably secured against the cavity to prevent the wireless communication device's unintentional dislodgement from the seated position against the cavity. A portion of the charging base 902 includes a vertical elongated aperture 906 that conforms to the width of antenna 108 (shown in FIG. 11) to allow the wireless communication device 100 to move straight down, or in an otherwise downward direction, into the charging base 902 without hindrance from the antenna 108. Cavity 904 includes charging base contacts (not shown) that are prearranged to provide an electrical connection with wireless communication device contacts (not shown) on the wireless communication device 100 when the wireless communication device is sitting at least partially within and/or against the cavity 904 causing the facilitation of battery charging. The charging of a battery may include the charging of a battery within the wireless communication device 100 and/or the portable video game device 110. The charging base 902 includes a charging status indicator light 908 which may include various colors that are illuminated based on the power level of the wireless communication device 100 and/or the portable video game device 110. For example, a left portion 912 of the charging status indicator light 908 may be green thereby indicating that the wireless communication device 100 is fully charged and the right portion 910 of the charging status indicator light 908 may be flashing yellow indicating that the battery of the portable video game device 110 is not yet fully charged, but is charging. Alternatively, (not shown) at least two status indicator lights 908 may be placed about the charging base 902 to indicate the status of each of the wireless communication device 100 and the portable video game device 110. All additional known systems and methods of indicating the charge of a device may be incorporated herein, including the use of various bar levels, percentages, colors, flashing, and/or solid lights, to name a few.

Figure 10:
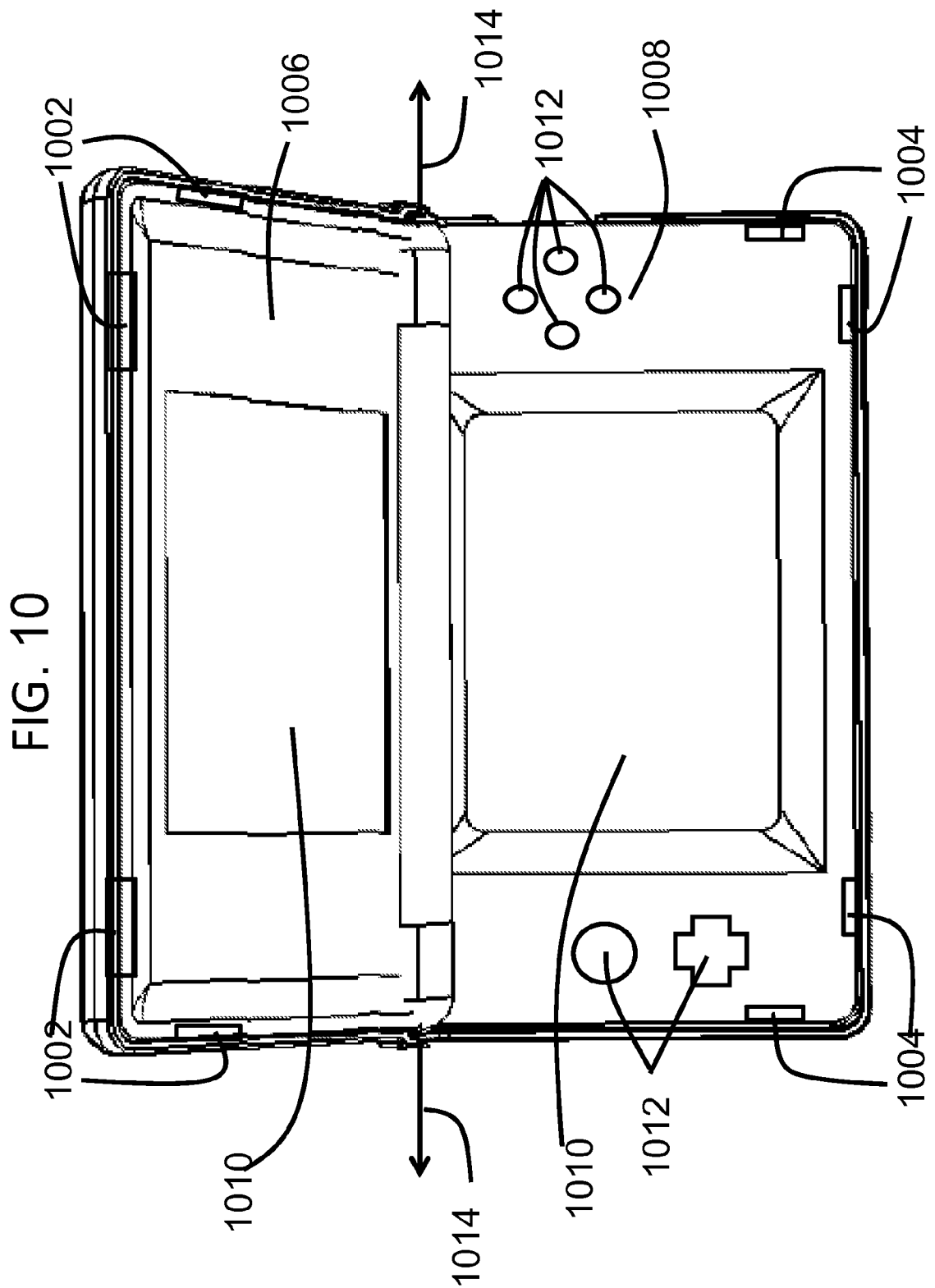
FIG. 10 is a perspective view of the wireless communication device having optimally placed tabs for facilitating the mating of the wireless communication device to the portable video game device in accordance with the principles of the present invention.

FIG. 10 is a perspective view of the wireless communication device wherein cover 204 has optimally placed tabs for facilitating the mating of the wireless communication device to the portable video game device 110. The portable video game device 110 has an upper portion 1006 and a lower portion 1008 in hinged relation to the upper portion 1006. The upper portion 1006 includes display screen 205 for displaying video games and other information. The lower portion 1008 has an upper facing portion that includes video game controls and buttons 1012. The upper facing portion may additional include a screen 1010. Screen 1010, as well as another screen or display referenced herein, may be touch screen, such as without limitation a resistive touch screen or a capacitive touch screen. The mating is facilitated by tabs 1002 that snap fit to edge of the forward facing portion of the upper portion 1006. The mating is further facilitated by tabs 1004 that snap fit to the edge of the upper facing portion of the lower portion 1008. Of course, the invention includes features that would allow it to readily and securely attach as shown, though the user should bear in mind that many other possibilities to securely attach the wireless communication device 100 to the portable video game device 110 exist. Such methods include adhesives, form fitted rubber over molds, screws, and many others.

Figure 11A:
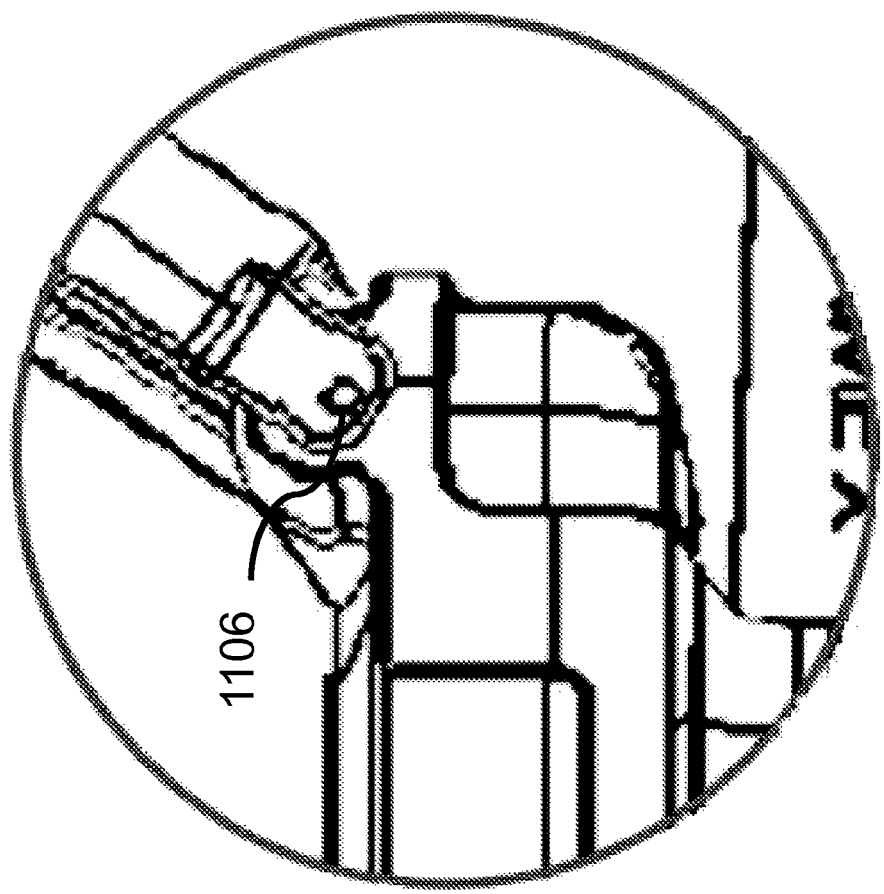
FIG. 11a is an enlarged side perspective view of FIG. 11 showing the hinged connection of the wireless communication device.

FIG. 11 is a side perspective view of the wireless communication device 100 having an upper case portion 1102 and a lower case portion 1104, the upper case portion 1102 in hinged relation to the lower case portion 1104. The upper case portion 1102 and the lower case portion 1104 pivot around an axis 1014, the axis depicted in FIG. 10. In an embodiment, the upper case portion 1102 includes a snap fit relationship. For example, upper case portion 1102 includes a distal aperture 1106 on each side of the upper case portion that has snap fit relationship with a protrusion on the lower case portion 1102. This snap fit relationship helps to secure the upper and lower case portions together to untimely removal of any particular case portion. Of course, the invention includes features that would allow it to readily and securely attach as shown, though the user should bear in mind that many other possibilities to securely attach the upper case portion to the lower case portion exist. Such methods include adhesives, form fitted rubber over molds, screws, and many others.

In one embodiment, when the transmission of data between the at least two wireless communication device 100 is voice data, the voice data may be translated into text, whereby the text may then be displayed on display 205 of the portable game device 110. The text may be transposed over the user's game to allow the recipient to read the message in the midst of game play. Voice data may be comprised of either—or both—analog and digital voice data signals.

In one embodiment, the wireless communication device 100 additionally facilitates the transmission of text message data that is displayed on the display 205 of the portable game device 110. Similar to the voice-to-text feature disclosed herein, the text message may be transposed over the user's game to allow the recipient to read the message in the midst of game play.

In one embodiment, game data is transmitted across the network 800 to at least one video game device 110 via facilitation from the wireless communication device 100. In this embodiment, the transmission of data is induced by at least one video game device 110, at least one wireless communication device 100 or a combination thereof. The game data may originate with the video game device 110 or with the wireless communication device 100. In operation, the user of one video game device 110 reaches a particular goal or milestone, which elicits the transmission of that game data for display of a message to another user of another video game device 110 of that achievement or other information. This embodiment effectuates competition between users by indicating the successful completion of video game milestones wherein milestones may include without limitation the completion of a game level, achieving a rank, earning a particular point level, and etc. The messages may also advise of a video character's death, number of deaths and continuations of that character.

In an embodiment, upon the successful completion of a milestone, a message will be displayed on display 205 requesting whether a message should be delivered to another video game device 110. If the user selects that a message should be delivered, the wireless communication device 100 of each of the video game device 110 shall facilitate the wireless transmission. The message may be a sound message or a visual message. The visual message may include pictures, videos and/or text.

In one embodiment, the wireless communication device is controlled completely and/or partially by the video game device 110. In a particular operation, the display 205 has a capacitive, resistance, or any other type of touch screen capability that accepts user interaction commands for controlling the wireless communication device. In further operation, the user may select, via the display 205, a particular game stored on the wireless communication device 100. In yet a further operation, the user may select a preconfigured message, enter a personal message, or a combination thereof to be transmitted across the network 800 to another wireless communication device 100 and/or video game device 110.

In one embodiment, the wireless communication device may be powered on and/or off via the video game device 110. In one exemplary embodiment, the wireless communication device powers on and off in relation to a power message received from the wireless communication device 100. Oppositely in another exemplary embodiment, powering on and off of the wireless communication device 100 causes the video game device 110 to turn on and off with the wireless communication device 100.

Although the preceding description contains significant detail, it should not be construed as limiting the scope of the invention but rather providing illustrations of the preferred embodiments of the invention.

REFERENCE NUMERALS IN THE DRAWINGS

100 Wireless communication device
101 Display
102 Slot for stylus
103 Battery door/compartment
104 Power ON/OFF button
105 Volume/Scroll buttons
106 Speaker
107 Push-to-Talk (PTT)
108 Antenna
109 Menu/Call button
110 Portable video game device
201 Game cartridge slot
202 Headphone jack
203 Microphone
204 Protective top cover
205 Display for portable video game device
302 Gaming device control buttons
401 Charging jack for wireless communication device
500 Power Supply
501 Radio transceiver charging circuit block
502 DC-to-DC switching regulator block
503 Wireless communication device battery
504 Radio transceiver block
505 Portable video game device block diagram
506 Video game device charging circuit block
507 Video game device circuit block
508 Video game device battery
509 Video game device charging contacts/port
510 Wireless communication device block diagram
602 Game cartridge interface
604 Game cartridge slot
606 Wireless communication unit
608 Processor
610 Visual alert generator
614 System bus
616 System bus
618 Processor
620 Digital storage
802 Cellular communication network
804 Internet
808 Ethernet LAN
902 Charging Base
904 Cavity
906 Aperture
908 Charging status indicator light
910 Right portion
912 Left portion
1002 Tabs
1004 Tabs
1006 Upper portion
1008 Lower portion
1010 Screen
1012 Buttons
1014 Axis
1102 Upper case portion
1104 Lower case portion
1106 Distal aperture

What is claimed is:

1. A portable wireless communication device configured for attachment to a portable electronic video game device, the portable wireless communication device comprising:
    a housing shaped to selectively attach to and detach from said portable electronic video game device, the housing including:
        a transceiver configured to facilitate digital messages between at least two portable electronic video game devices;
        at least one antenna; and
        a push-to-talk button mechanically activated with a user's finger while actively playing the battery-powered portable electronic video game device.

2. The communication device of claim 1, wherein said transceiver is a two-way radio transceiver.

3. The communication device of claim 1, further comprising a microphone operable to detect voice and cause the transceiver to automatically transmit using Voice-Operated Transmit (VOX).

4. The communication device in claim 1, wherein:
the transceiver is powered only by a battery power source.

5. The communication device of claim 4, wherein:
the battery power source is electrically couplable to the portable video gaming device.

6. The communication device of claim 1, further comprising at least one display.

7. The communication device of claim 1, wherein said housing includes tabs aligned with indentions within an outer surface of the portable electronic gaming device and operable to secure the housing to the portable video game device when the tabs are in contact with the indentions.

8. The communication device of claim 1, wherein said housing includes:
an upper housing portion; and
a lower housing portion,
the upper housing portion being engaged with said lower housing portion at a pivot axis.

9. The communication device of claim 1, wherein the transceiver uses at least one of:
analog coded squelch (CTCSS) to establish a call;
digital coded squelch (DCS) to establish a call; and
frequency hopping to establish a call.

10. The communication device of claim 1, wherein the housing further includes:
a digital music storage and playing device.

11. The communication device of claim 1, wherein the transceiver is a two-way radio operating on a license free Family Radio Service (FRS) frequency.

12. The communication device of claim 1, wherein the transceiver is a digital two-way radio operating on a license free Industrial Scientific and Medical (ISM) band.

13. A portable wireless communication assembly configured for attachment to a battery-powered portable electronic video game device, the portable wireless communication assembly comprising:
a housing shaped to receive and hold the battery-powered portable electronic video game device;
a wireless transceiver coupled to said housing and configured to facilitate digital messages between at least two portable electronic video game devices;
at least one antenna coupled to said housing; and
a push-to-talk button mechanically activatable with a user's finger while actively playing the battery-powered portable electronic video game device.

14. The portable wireless communication device of claim 13 wherein said housing is a protective housing configured for protecting the portable electronic video game device.

15. The portable wireless communication device of claim 13 further including a game cartridge slot configured to mate with a video game cartridge.

16. The portable wireless communication device of claim 13 wherein said transceiver is further configured to facilitate delivery of text messages to a display of the electronic video game device.

17. The portable wireless communication device of claim 13 further configured to facilitate storage of a digital music files and audible playback of the digital music files.

18. A portable wireless communication assembly having a first battery source configured for attachment to a battery-powered portable electronic video game device having a second battery source, the portable wireless communication device comprising:
a charging station having a cavity configured to provide power to at least one of the batteries;
a housing having an interior and an exterior face, said interior face shaped to hold the battery-powered portable electronic video game device, said exterior face shaped to form fit against said cavity for providing power to at least one of the batteries;
a wireless transceiver coupled to said housing and configured to facilitate digital messages between at least two portable electronic video game devices;
at least one antenna coupled to said housing; and
a push-to-talk button mechanically activatable with a user's finger while actively playing the battery-powered portable electronic video game device.

\* \* \* \* \*